Figure 1:
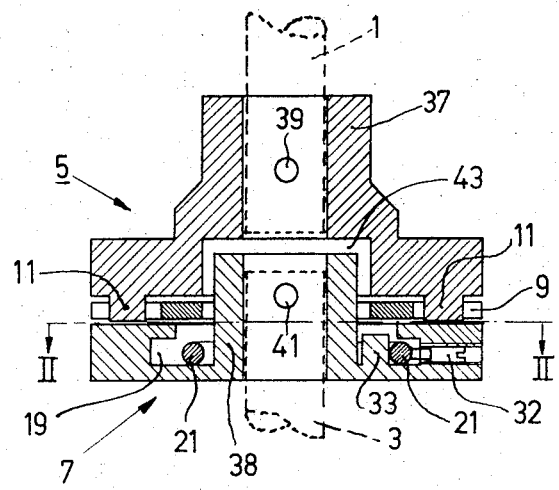

United States Patent [19]
Clijsen

[11] 3,728,871
[45] Apr. 24, 1973

[54] COUPLING FOR SHAFTS
[75] Inventor: Cornelis Wilhelmus Adrianus Clijsen, Emmasingel, Eindhoven, Netherlands
[73] Assignee: U.S. Philips Corporation, New York, N.Y.
[22] Filed: June 15, 1971
[21] Appl. No.: 153,243

[30] Foreign Application Priority Data
June 19, 1970 Netherlands .......................7008983

[52] U.S. Cl. ....................................64/27 R, 64/15 R
[51] Int. Cl..................................................F16d 3/14
[58] Field of Search......................................64/15, 27

[56] References Cited
UNITED STATES PATENTS

| | | | |
|---|---|---|---|
| 3,026,692 | 3/1962 | Budnick | 64/15 R |
| 3,473,349 | 10/1969 | Tateyama | 64/15 R |

FOREIGN PATENTS OR APPLICATIONS

| | | | |
|---|---|---|---|
| 943,109 | 11/1963 | Great Britain | 64/15 R |

Primary Examiner—Edward G. Favors
Attorney—Frank R. Trifari

[57] ABSTRACT

A coupling for shafts comprising a coupling disc and two connecting flanges. A spring is located in one of the flanges for eliminating rotational play in conjunction with a cam on the other connecting flange. Clamping means are provided to clamp said spring free from the cam for assembly purposes.

4 Claims, 4 Drawing Figures

PATENTED APR 24 1973
3,728,871

INVENTOR.
CORNELIS W.A. CLIJSSEN

BY
Frank R. Trifari
AGENT

INVENTOR.
CORNELIS W.A. CLIJSSEN

COUPLING FOR SHAFTS

The invention relates to a coupling for connecting two approximately registering shafts. The coupling has two connecting pieces each separately mounted on the two shafts and a loose coupling disc fitted therebetween which couples the rotary movements of both connecting pieces to each other and which has a limited play in two mutually perpendicular radial directions with respect to the individual connecting pieces. Play in the direction of rotation is eliminated by resilience of a spring member. A coupling of this kind is known from the British Patent Specification 659,302 and can be used, for example, for coupling variable capacitors. One of the difficulties in assembling this kind of coupling is the fact that the springs used for eliminating the play in the direction of rotation have to be fitted under tension in hard to get at places.

The object of this invention is to provide a construction for assembling the coupling without the resilience of the spring member causing problems.

According to the invention this object is fulfilled by providing a coupling with one of the connecting pieces having an approximately annular chamber provided approximately concentric to the shaft, and a C-shaped spring is accommodated in the chamber producing the resilience for eliminating rotational play. One end of the spring engages an abutment member and the free end is pressed by its resilience in a tangential direction against a cam on the other connecting piece. The cam protrudes into the chamber through an aperture in the coupling disc. The connecting piece which contains the chamber is provided with a clamping device near the said free end of the spring. The clamping device is operable on the outside of the connecting piece and enables the spring to be clamped in a position in which the free end thereof is free from the cam.

By means of the above described clamping device the spring can be clamped prior to assembly into a position in which its resilience will not act upon the cam so that assembly is not hampered by the spring. After completion of assembly, the clamping device is brought into a position in which the spring is released. The free end of the spring then engages the cam and the play in the direction of rotation is eliminated.

In order that the invention may be readily carried into effect, one embodiment thereof will now be described in detail, by way of example, with reference to the accompanying diagrammatic drawing, in which FIG. 1 shows an axial cross-section through a coupling according to a preferred embodiment of the invention.

Figure 2:
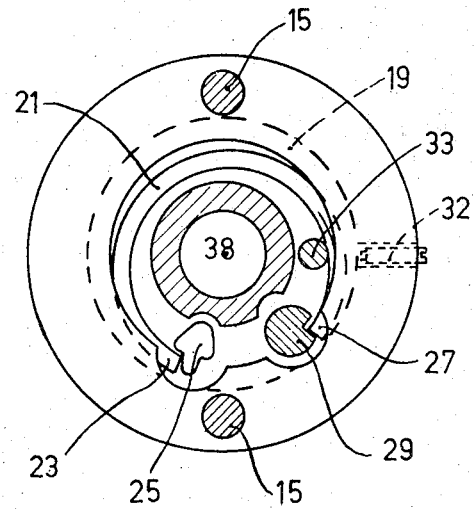
Figure 3:
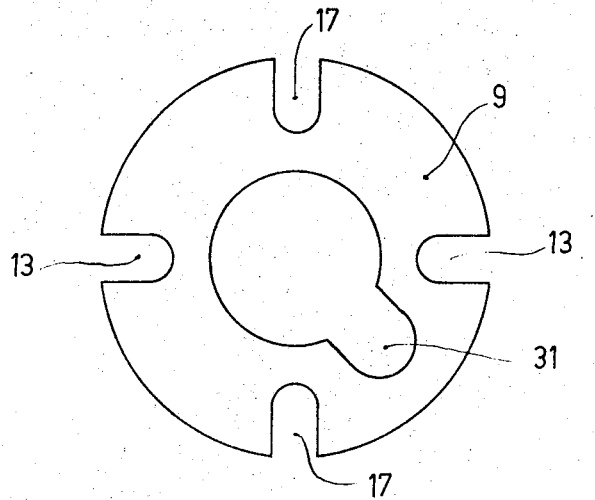
Figure 4:
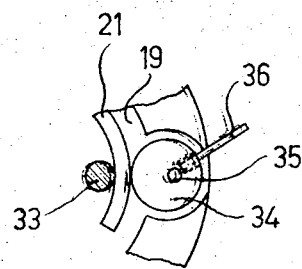

FIG. 2 shows a cross-section through the coupling of FIG. 1, taken along line II—II, FIG. 3 shows the coupling disc of the same coupling separately, and FIG. 4 shows a clamping device according to a construction which is different from FIG. 2.

The coupling shown in FIG. 1, which serves to couple two shafts 1 and 3 which are shown in broken lines, comprises two connecting pieces 5 and 7 to be mounted separately on the shafts 1 and 3, and a loose coupling disc 9 provided therebetween (see also FIG. 3). In order to enable coupling of shafts which do not exactly register, the coupling disc 9 has a limited plate in a radial direction with respect to the upper connecting piece 5 shown in FIG. 1, and also a limited play with respect to the lower connecting piece 7 in a perpendicular radial direction with respect to the first-mentioned direction. For this purpose, the upper connecting piece 5 is provided with two diametrically arranged pins 11 which are parallel to the shafts and which engage cut-outs 13 (see FIG. 3) in the coupling disc 9. The dimension of the cut-outs 13 in the direction of rotation is only slightly larger than the diameter of the pins 11, their dimension in the radial direction being considerably larger than said diameter. Similarly, the lower connecting piece 7 is provided with two pins 15 (see FIG. 2) engaging cut-outs 17 in the coupling disc 9. The cut-outs 17 are identical to the cut-outs 13, but are located on the disc 90°20 away from cut-outs 13. with respect thereto.

An approximately annular chamber 19 is situated in the lower connecting piece 7 and is approximately concentric with the shaft 3 (chamber partly shown in broken lines in FIG. 2). A C-shaped spring 21 is accommodated in this chamber. One end 23 of the spring engages abutment member 25 which is connected to the lower connecting piece 7. The free end 27 of the spring is pressed by its resilience against a cam 29 on the upper connecting piece 5. The cam 29 protrudes through an aperture 31 in the coupling disc 9 into the chamber 19. The spring 21 ensures that the play of both connecting pieces 5 and 7 in the direction of rotation with respect to each other, is eliminated. During assembly of the coupling it should be possible to insert the cam 29 into the chamber 19 without difficulty. For this purpose, the free end 27 of the spring 21 is pressed outside the space to be occupied by the cam by means of a tool, i.e. it is moved in the right-hand top direction in FIG. 2, after which the spring 21 is fixed in this position by means of a clamping device. This device preferably consists of a clamping screw 32 which extends radially into the chamber and a block 33 which is permanently connected to the lower connecting piece 7. The spring 21 extends through the space between the clamping screw 32 and the block 33 and can be clamped against the block 33 in the desired position by screwing in the clamping screw 32. In addition to the described clamping device, other designs are possible such as, for example, a disc 34 (see FIG. 4) instead of the clamping screw 32. The disc 34 can be rotated around an eccentrically arranged shaft 35, for example, by means of a pin 36 to be inserted into the disc 34. The space between the disc 34 and the block 33 can thus be increased or reduced, as desired.

In the embodiment shown in FIG. 1 the connecting pieces 5 and 7 are secured by means of bushes 37 and 38 on the relevant shafts 1 and 3 by screwing set screws (not shown) into threaded holes 39 and 41. A considerable saving of space can then be achieved in the axial direction by arranging the bush 38 of the connecting piece 7 (containing the chamber) at the side of this connecting piece facing the coupling disc 9 and by providing the other connecting piece 5 with a recess 43 into which a portion of the bush 38 extends.

I claim:

1. A coupling for connecting two approximately collinear shafts, comprising two connecting pieces for mounting one on each shaft and a loose coupling disc fitted therebetween which couples rotary movement of each connecting piece to the other and which has a limited amount of play in two mutually perpendicular directions one each of which is radial with respect to one each of the connecting pieces, wherein a first connecting piece has a chamber which is approximately annular, which is approximately concentrical with the shaft on which the connecting piece is mounted, and which accommodates a C-shaped spring providing resilience to take up rotary play between the coupled shafts, wherein a first end of the spring engages an abutment member fixed to the first connecting piece whilst the second end may be pressed by the resilience of the spring in a tangential direction against a stop which is fixed to the second connecting piece and which protrudes into the chamber through an aperture in the coupling disc, and wherein the first connecting piece is provided near the location of the second end of the spring with a clamping device which is operable from the outside of the connecting piece and which enables the spring to be clamped in a position in which the second end thereof is clear of the stop.

2. A coupling as claimed in claim 1 wherein the clamping device comprising a clamping screw which can be screwed into the chamber in the radial direction and which is so arranged that the spring extends between the end of the screw and a fixed block and can be clamped in the desired position against the block by screwing in the screw.

3. A coupling as claimed in claim 1, in which each of the connecting pieces can be secured to the relevant shaft by means of a bush, the bush of the connecting piece accommodating the chamber being situated on the side of this connecting piece facing the coupling disc and partly extending into a recess in the other connecting piece.

4. A coupling device for connecting two substantially colinear shafts comprising first and second connecting pieces each piece to be connected to one of said shafts, means for securing each of said connecting pieces to said shafts, a disc for coupling rotary motion of one connecting piece to the other carried between said connecting pieces, a substantially annular chamber arranged within one of said connecting pieces, a C-shaped spring carried within said chamber, an abutment member fixed to said first connecting piece for engaging one end of said C-shaped spring, a stop member fixed to said second connecting piece against which the other end of said spring will be urged by its resilience, said stop extending into said chamber through an aperture in said disc, and a clamping means carried by one of said connecting pieces for clamping said spring in a position in which its end is free from said stop so that when the spring is unclamped its end will engage said stop taking up rotational play.

* * * * *